United States Patent
Brito et al.

(10) Patent No.: US 6,184,645 B1
(45) Date of Patent: Feb. 6, 2001

(54) VOLTAGE MODE DRIVE FOR CONTROL CIRCUIT FOR AN ACTUATOR USING SAMPLED BACK EMF CONTROL

(75) Inventors: Joao Carlos F. Brito, Richardson; John K. Rote; Robert E. Whyte, Jr., both of Dallas, all of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/388,508

(22) Filed: Sep. 2, 1999

(51) Int. Cl.$^7$ .................................................. G05D 23/275
(52) U.S. Cl. ......................... 318/632; 318/636; 318/430; 318/254; 318/439; 318/805; 318/806; 388/806; 388/815; 388/821; 388/928.1
(58) Field of Search .................................... 318/632, 636, 318/650, 430–434, 439, 254, 805, 806, 812, 566, 568.18, 568.22, 609, 610; 388/806, 815, 821, 822, 928.1; 364/161, 162

(56) References Cited

U.S. PATENT DOCUMENTS

| 4,531,167 | * | 7/1985 | Berger | 360/77 |
| 5,602,689 | * | 2/1997 | Kadlec et al. | 360/78.04 |
| 5,677,809 | * | 10/1997 | Kadlec | 360/78.09 |
| 6,040,671 | * | 3/2000 | Brito et al. | 318/603 |

* cited by examiner

Primary Examiner—Robert E. Nappi
Assistant Examiner—Edgardo San Martin (74) Attorney, Agent, or Firm—J. Dennis Moore; Wade James Brady, III; Frederick J. Telecky, Jr.

(57) ABSTRACT

An apparatus for controlling an actuator in response to a target speed voltage signal, the actuator having a moveable member and having a coil that influences movement of the member. A first summing node is provided having a control output voltage, for summing or subtracting voltages applied thereto, as the case may be and receiving the target speed voltage signal at a first, summing input thereto. A proportional compensation unit is provided, receiving the control output voltage and providing as an output a proportionally compensated output signal. An integral compensation unit is provided, receiving the control output voltage and providing as an output an integrally compensated output signal. An inverse compensation unit is provided, receiving the target speed voltage signal as an input and providing an inversely compensated output signal having a voltage corresponding to the voltage of the target speed voltage signal multiplied by the inverse of a predetermined amplification factor. A second summing node is provided, receiving the proportionally compensated output signal, the integrally compensated output signal and the inversely compensated output signal, and having a command output signal corresponding to the sum of the input signals. An amplifier is provided, receiving the command output signal and having a drive output signal for driving the actuator. Finally, a sense unit is provided for sensing a back-EMF of the actuator and providing a voltage corresponding to the sensed back-EMF to a second, subtracting input of the first summing node, such that the control output voltage corresponds to the difference between the target speed voltage and the sensed back-EMF. The inversely compensated output signal substantially provides a voltage to the amplifier sufficient to cause the amplifier to provide the drive output signal at a voltage corresponding to the voltage of the target speed voltage signal.

17 Claims, 3 Drawing Sheets

VOLTAGE MODE DRIVE FOR CONTROL CIRCUIT FOR AN ACTUATOR USING SAMPLED BACK EMF CONTROL

TECHNICAL FIELD OF THE INVENTION

This invention relates in general to control of an actuator and, more particularly, to a method and apparatus for accurately controlling the velocity of an actuator member by monitoring the back electromotive force ("EMF") of an actuator coil, and driving the coil with a voltage.

BACKGROUND OF THE INVENTION

Conventional actuators, sometimes referred to as "motors", have a movably supported member, and a coil. When a current is passed through the coil, a motive force is exerted on the member. A control circuit is coupled to the coil in order to controllably supply current to the coil. One example of such an arrangement is found in a hard disk drive, where the movable member of the actuator supports a read/write head adjacent a rotating magnetic disk for approximately radial movement of the head relative to the disk. There are situations in which it is desirable to move the member to one end of its path of travel at a predetermined velocity which is less than its maximum velocity. An example of such a situation is a power failure. In such a situation, it is desirable to move the member to a parking location, where it is held against potentially damaging movement which could occur if the member were not so parked. The movement of the member to the parking location is commonly referred to as a retract of the member.

When a current is applied to the coil of the actuator, the member is subjected to a force tending to accelerate the member at a rate defined by the magnitude of the current, and in a direction defined by the polarity of the current. Consequently, in order to accelerate or decelerate the member until it is moving at a desired velocity and in a desired direction, it is important to know the actual direction and velocity of the member. In this regard, it is known that the back-EMF voltage on the coil of the actuator is representative of the velocity and direction of movement of the member. Specifically, the following relationship applies to actuators:

$$V_M = I_M * R_M + K_e \omega$$

where:

$V_M$=voltage across actuator (motor),
$I_M$=current through actuator,
$R_M$=internal resistance of actuator,
$K_e$=torque constant of actuator, and
$\omega$=velocity of actuator.

The term, $K_e\omega$, represents the back-EMF of the actuator coil.

Apparatus have been provided that control such actuators by providing a drive current to the coil of the actuator in response to the provision of a target speed voltage signal having a voltage corresponding to the target speed of the moveable member. For example, co-pending patent application Ser. No. 09/239,188, filed on Jan. 28, 1999, and entitled "CONSTANT VELOCITY CONTROL FOR AN ACTUATOR USING SAMPLED BACK EMF CONTROL," discloses such an apparatus. However, such apparatus does not lend itself readily to providing such control in cases where the drive transistors for the actuator are power MOSFETs external to the integrated circuit ("IC") containing the control circuitry. In such cases, it is difficult and/or expensive to implement a current mode output. To do so would require current feedback. To process this feedback, additional circuitry would be required. This additional circuitry would add expense and would be difficult to operate at low voltages.

Accordingly, it is desired to have an apparatus that controls actuators using a voltage mode output. Such a configuration would eliminate the requirement for current sensing and should, therefore, be simpler and less expensive to build.

SUMMARY OF THE INVENTION

The present invention provides an apparatus for controlling an actuator in response to a target speed voltage signal, the actuator having a moveable member and having a coil that influences movement of the member. A first summing node is provided having a control output voltage, for summing or subtracting voltages applied thereto, as the case may be and receiving the target speed voltage signal at a first, summing input thereto. A proportional compensation unit is provided, receiving the control output voltage and providing as an output a proportionally compensated output signal. An integral compensation unit is provided, receiving the control output voltage and providing as an output an integrally compensated output signal. An inverse compensation unit is provided, receiving the target speed voltage signal as an input and providing an inversely compensated output signal having a voltage corresponding to the voltage of the target speed voltage signal multiplied by the inverse of a predetermined amplification factor. A second summing node is provided, receiving the proportionally compensated output signal, the integrally compensated output signal and the inversely compensated output signal, and having a command output signal corresponding to the sum of the input signals. An amplifier is provided, receiving the command output signal and having a drive output signal for driving the actuator. Finally, a sense unit is provided for sensing a back-EMF of the actuator and providing a voltage corresponding to the sensed back-EMF to a second, subtracting input of the first summing node, such that the control output voltage corresponds to the difference between the target speed voltage and the sensed back-EMF. The inversely compensated output signal substantially provides a voltage to the amplifier sufficient to cause the amplifier to provide the drive output signal at a voltage corresponding to the voltage of the target speed voltage signal.

These and other features of the invention will be apparent to those skilled in the art from the following detailed description of the invention, taken together with the accompanying drawings.

DETAILED DESCRIPTION OF THE PREFERRED EMBODIMENTS

Figures 1, 2:
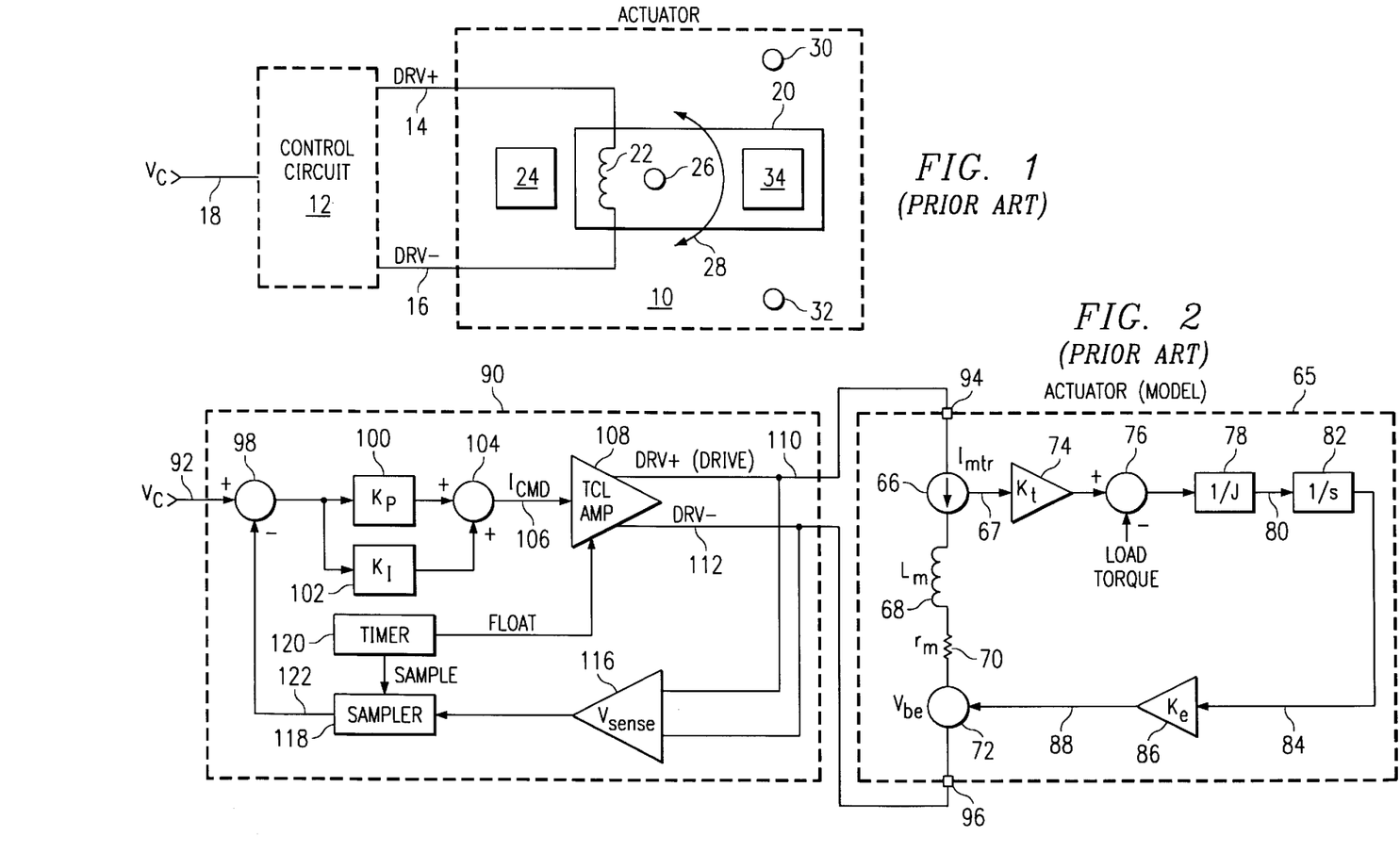
FIG. 1 is a diagram of a typical prior art actuator control system.
FIG. 2 is a block diagram of a prior art control unit for the system of FIG. 1.

FIG. 1 is a diagrammatic view of a typical prior art system including an actuator 10 under control of a control circuit 12.

The particular system shown is that of a hard disk drive, in which the actuator 10 controls the movement of a member 20 on which a read/write head 34 is mounted. The control circuit 12 applies drive signals DRV+ on line 14 and DRV− on line 16 in response to a move command voltage signal $V_C$ on line 18. The drive signals DRV+ and DRV− cause motion in a member 20 of actuator 10 by setting up a force field in a coil 22 on the member 20. The force field thus set up in coil 22 interacts with the magnetic field of a permanent magnet 24 disposed nearby. Member 20 is constrained to move about a shaft 26, resulting in pivoting motion as shown by arrow 28. The member is constrained in its movement between a first stop 30 and a second stop 32. The result is that a magnetic head 34 is caused to move about a magnetic disk (not shown in this figure) in conjunction with the reading and writing of data from and to the magnetic disk in a hard drive system.

FIG. 2 is a high level block diagram of a prior art control unit and the actuator it controls, such as is used in the system shown in FIG. 1. A control circuit 90 receives a move command signal $V_c$ on line 92 and provides drive current DRV+ and DRV− to an actuator. In FIG. 2 the actuator shown is an idealized model 65 of an actuator. It will be appreciated that the control circuit 90 would be unable to "see" a significant difference between the actuator model 65 and an actual actuator, were an actual actuator connected to control circuit 90.

The actuator model 65 includes an ideal current sensor 66, an inductance 68, a resistance 70 and an ideal voltage-controlled voltage source 72, all coupled in series between the two terminals 94, 96 of the actuator model 65. The output 67 of the ideal current sensor 66 is a signal representing the current flowing through the actuator. This signal 67 is coupled to an input of an amplifier 74, which has a gain $K_t$ that represents a torque constant of the moveable member 20 (FIG. 1). The output of the amplifier 74 is coupled to the input of a junction 76, which adjusts the amplifier output using a signal representing a load torque. The output of junction 76 is coupled to the input of a circuit 78, which makes an adjustment representative of the inertia J, of the member 20.

The output 80 of the circuit 78 is a signal which represents an acceleration of the member 20. The signal 80 is integrated at 82, in order to obtain a signal 84 which represents the velocity of the member 20. The signal 84 is applied to the input of an amplifier 86 having a gain $K_e$ that represents an electrical constant for the back-electromotive force (EMF) of the actuator. The output 88 of the amplifier 86 is a voltage $V_{be}$ which represents the back-EMF voltage of the actuator. This voltage is applied to an input of the ideal voltage-controlled voltage source 72, which reproduces this same voltage $V_{be}$ across its output terminals. Since the voltage source 72 is ideal, it produces the output voltage regardless of whether there is any current flowing through source 72.

Since the signal 84 represents the actual velocity of the member 20, and since the back-EMV voltage $V_{be}$ present at 88 and across source 72 is proportional to the magnitude of signal 84, it will be appreciated at the magnitude of the back-EMF voltage $V_{be}$ across source 72 is an accurate representation of the actual velocity of the member 20. However, when a current is flowing through the actuator model 65, the resistance 70 produces a voltage which is added to the voltage $V_{be}$ across the voltage source 72. Consequently, so long as current is flowing through the actuator model 65, it is not possible to accurately measure the voltage $V_{be}$ alone, in order to accurately determine the actual velocity of the movable member.

Therefore, the system of FIG. 2 independently measures the back-EMF voltage $V_{be}$, and thus determines the actual velocity of the member 20. It does this by interrupting the current flow through the actuator coil 68 so that the voltage across the resistance 70 goes substantially to zero, after which the back-EMF voltage $V_{be}$ is measured across the two terminals 94, 96, of the actuator model 65. It is a characteristic of the actuator that the back-EMF voltage $V_{be}$ does not change rapidly after the current flow through the actuator model 65 is decreased to zero, once short term transient effects have died down.

The control circuit 90 includes the following components. A junction 98 receives the retract command voltage signal $V_C$ on line 92 that corresponds to a target velocity for the actuator member 20. The output of junction 98 is provided to a proportional compensation unit 100 that provides a proportional amplification to the input provided thereto. Thus, the output of unit 100 is some multiple of the input, i.e., unit 100 is substantially a linear amplifier. Of course, the proportional factor in unit 100 may be one, in which case the output would be the same as the input.

The output of terminal 98 is also provided to an integral compensation unit 102, which provides a mathematical integration operation on its input to derive its output. The output of unit 100 provided to one input of terminal 104, while the output of unit 102 is provided to another input of terminal 104. The output of units 100 and 102 are added in terminal 104, and the output, which is a voltage the level of which represents a commanded current level, $I_{CMD}$, is provided on line 106 to a transconductance linear amplifier 108. The outputs of amplifier 108 are the differential drive currents DRV+ and DRV− which are provided on lines 110 and 112, respectively. The DRV+ signal is synchronous with a DRIVE control signal described below. Lines 110 and 112 are provided to input terminals 94 and 96, respectively, of the actuator model 65. Lines 110 and 112 are also connected to the differential inputs of a voltage sense unit 116. The output of the voltage sense unit 116 is provided to a sampler unit 118. A timer 120 generates two timing signals, a FLOAT timing signal which is applied to transconductance amplifier 108 and a SAMPLE timing signal which is applied to sampler unit 118. The output of sampler unit 118, on line 122 is provided to a second input to terminal 98. The signal on line 122 is subtracted from the signal on line 92 in terminal 98.

Figure 3:
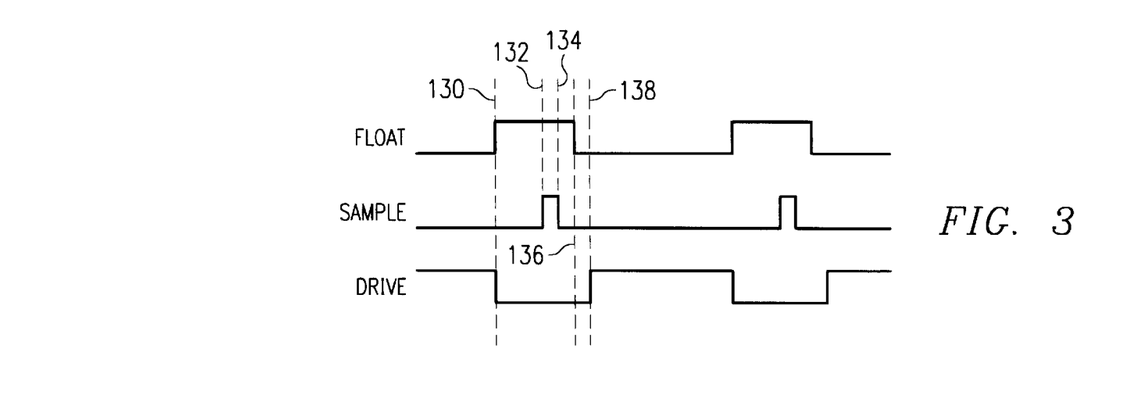
FIG. 3 is a timing diagram for signals appearing in FIG. 2.

The operation of the control circuit 90 of FIG. 2 may be better understood by reference to the signal timing diagram shown in FIG. 3. FIG. 3 shows the FLOAT timing signal, the SAMPLE timing signal, and the DRIVE drive signal, all mentioned above. These three signals are presented along a common horizontal time axis, and so their relative timings may be easily seen. As can be seen in FIG. 3, the FLOAT signal is a regularly recurring rectangular pulse. Looking now at one set of pulse signals, at timing 130 the FLOAT signal begins. This causes amplifier 108 (FIG. 2) to turn off the drive signals, as can be seen by looking at the signal DRIVE in FIG. 3. After sufficient time for the transient effects in inductor 68 (FIG. 2) of the actuator to die down, at timing 132, a SAMPLE pulse begins. A SAMPLE pulse is provided for a sufficiently long period of time to enable the sampler unit 118 (FIG. 2) to sense the voltage at the output of amplifier 116. At time 134 the SAMPLE pulse ceases. After a small delay, at time 136, the FLOAT signal ends. A short time thereafter, at time 138, the drive signals resume. The sequence thus described repeats regularly. Details of the timings of these signals are provided below, in connection with the description of FIG. 5.

Thus, in operation, the command voltage $V_C$ is provided on line 92 to terminal 98. There, it is combined with a voltage on line 122, which is described in detail below. The output of terminal 98 is provided to the proportional compensation unit 100 and integral compensation unit 102, the outputs of which are combined in terminal 104 to yield the current command signal $I_{CMD}$. The current command signal $I_{CMD}$ is converted into actual drive currents by the transconductance amplifier 108, to yield the drive currents DRV+ and DRV− which are applied to the terminals 94 and 96, respectively, on the actuator model 65. At the same time, the voltage across terminals 94 and 96 is sensed by voltage sense unit 116. The timer unit 120 applies the FLOAT signal to amplifier 108, thus interrupting the drive current, a short time after which the SAMPLE signal is provided to sampler unit 118, which samples and stores the voltage output from voltage sense unit 116, thus the back-EMF voltage, undisturbed by voltage effects produced by the application of the drive currents, is sensed and stored in the sampler unit 118 on a regularly occurring basis. This sampled and held voltage is provided on line 122 to the terminal 98 where it is subtracted from the command voltage $V_{CMD}$ to yield a feedback-corrected control voltage.

The feedback-corrected command voltage is then applied to the proportional compensation unit 100 and the integral compensation unit 102. As mentioned above, the proportional compensation unit 100 provides an output that is some multiple of its input. This multiple may be unity. The purpose of the proportional compensation unit 100 is to shape $I_{CMD}$ so as to enable the control circuit 90 to respond better to large errors in the actual velocity, as compared with the desired, commanded velocity, while ensuring stability in the control circuit 90. This is desired because, for example, in a retract operation, the situation in which the retract is initiated may be in the middle of a hard drive "hard seek" operation. In a hard seek the actuator coil is driven to the point of maximum velocity so as to rapidly move the head to a desired track on the hard drive. The voltage corresponding to this velocity might be, say, 7 Volts. By contrast, an exemplary voltage corresponding to a desired retract operation speed may be, say, one volt. The proportional compensation unit 100 allows the control circuit 90 to immediately respond to this wide disparity between actual speed and desired speed, without destabilizing the system. In selecting a suitable value for the proportional amplification factor, the practitioner should keep stability foremost, and set a bandwidth that is significantly less than the frequency of the SAMPLE signal pulses, while allowing relatively quick control of the actuator.

The integral compensation unit 102, as mentioned above, provides a mathematical integration operation on its input to derive its output. Thus, its response is slower than the proportional compensation unit 100, and is unsuitable for reliance to respond to large errors in velocity, such as described above. This is why the proportional compensation unit 100 is provided. However, the proportional compensation unit 100 is not optimal for response to large changes in the torque load the actuator member may encounter. In such situations, the proportional compensation unit 100 is inadequate to maintain the desired relatively constant velocity. By contrast, the integral compensation unit 102 does respond well to even large and abrupt changes in torque load. When such a large torque load change is encountered, the integral compensation unit 102 gradually integrates the change in resultant velocity that the torque load change is inducing, and steadily increases the compensating current command to maintain the velocity constant. The result is adequate magnitude compensating current command, without destabilization of the control circuit 90.

However, while capable of providing good actuator control, the system described above in connection with FIGS. 2 and 3 uses current mode output, which requires some form of current feedback. Current feedback may be difficult to obtain when the MOSFETs used to drive the actuator are external to the control IC. The preferred embodiment of the present invention improves upon the system of FIG. 2, and provides excellent control in systems where the drive transistors for the actuator are power MOSFETs external to the IC containing the control circuitry. The preferred embodiment provides such control without excessive expense, and is capable of operation in conditions of low voltage operation.

Figure 4:
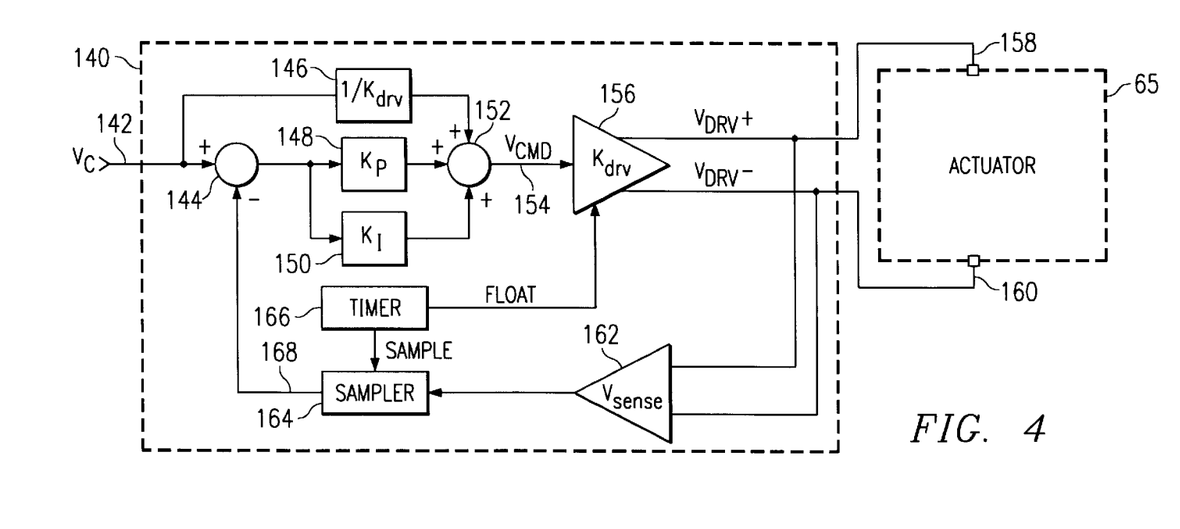
FIG. 4 is a block diagram of a preferred embodiment of the present invention.

FIG. 4 is a high level block diagram of a control unit 140 in accordance with a preferred embodiment of the present invention. The control circuit 140 receives a move command signal $V_c$ on line 142 and provides drive voltages $V_{DRV}+$ and $V_{DRV}-$ to an actuator 65. The command signal $V_C$ on line 142 is provided to a junction 144 and to an inverse proportional compensation unit 146. The output of junction 144 is provided to a proportional compensation unit 148 that provides a proportional amplification to the input provided thereto, and provides an output that is some multiple of the input. Thus, proportional compensation unit 148 may be a linear amplifier.

The output of junction 144 is also provided to an integral compensation unit 150 that provides a mathematical integration operation on its input to derive its output. The output of unit 146 is provided to one input of a terminal 152, while the output of unit 148 is provided to anther input of terminal 152, and the output of unit 150 is provided to still another input of terminal 152. The outputs of all three units 146, 148 and 150, are added in terminal 152, and the output, which is a voltage the level of which represents a command voltage, $V_{CMD}$, is provided on line 154 to a linear amplifier 156 having a gain of $K_{DRV}$. The outputs of amplifier 156 are the differential drive voltages $V_{DRV}+$ and $V_{DRV}-$ which are provided on lines 158 and 160, respectively, to actuator 65. The drive signal $V_{DRV}+$ is synchronous with a DRIVE control signal in a similar manner to the way in which the drive signal DRV+ in FIG. 2 is synchronous with a DRIVE control signal in that configuration. Lines 158 and 160 are provided to the input terminals of the actuator 65, and are also connected to the differential inputs of a voltage sense unit 162. The output of the voltage sense unit 162 is provided to a sampler unit 164. A timer 166 generates two timing signals, a FLOAT timing signal which is applied to linear amplifier 156 and a SAMPLE timing signal which is applied to sampler unit 164. The output of sampler unit 164, on line 168 is provided to a second input to terminal 144. The signal on line 168 is subtracted from the signal on line 142 in terminal 144.

Some aspects of the operation of the control circuit 140 are similar to those of control circuit 90 of FIG. 2. In particular, the voltage sense unit 162, sampler unit 164, and timer 166 operate in a similar manner to corresponding voltage sense unit 116, sampler unit 118, and timer 120, described above. Thus, the signals shown in FIG. 3 are generated in essentially the same manner in the control circuit 140 of FIG. 4, and their function and relative timings are also essentially the same. However, it will be appreciated that the DRIVE and FLOAT signals in FIG. 2 control the generation of the DRV+ and DRV− signals, while the corresponding DRIVE and FLOAT signals in FIG. 4 control the generation of the $V_{DRV}+$ and $V_{DRV}-$ signals. Bearing that in mind, the timings of the signals used the control circuit 140 of FIG. 4 may be readily understood from the description of the relative timings of signals described above in connection with FIG. 3, and such discussion will not be repeated here, in the interest of brevity.

The function and operation of the proportional compensation unit 148 and of the integral compensation unit 150 are, likewise, similar to that of the proportional compensation unit 100 and of the integral compensation unit 102 of FIG. 2. However, it will be appreciated that in the control circuit 90 of FIG. 2, the compensation performed is for the purpose of ultimately generating a pair of control currents, the DRV+ and DRV− signals, while in the control circuit 140 of FIG. 4, the compensation performed is for the purpose of ultimately generating a pair of control voltages, the $V_{DRV}+$ and $V_{DRV}-$ signals. Otherwise, the compensation is the same.

However, note that additional compensation unit 146 is provided. This unit provides inverse proportional compensation in the form of amplification by an inverse factor, specifically, the inverse of the amplification factor of amplifier 156. Amplifier 156 has an amplification factor of $K_{DRV}$, and so the amplification factor of unit 146 is $1/K_{DRV}$. The compensation provided by unit 146 is not on the output of terminal 144. Rather, it is provided directly to the input command signal $V_C$ on line 142. The compensated output of unit 146 is then provided to terminal 152, where it is combined with the outputs of compensation units 148 and 150.

A benefit of the novel compensation provided by unit 146 is to provide a net drive signal when the actuator is moving at a velocity substantially equal to that represented by the command signal $V_C$, without requiring the integral compensation unit 150 to use a significant portion of its range. Since the control circuit 140 is a voltage drive system, when the back-EMF voltage is the same as the voltage of the command signal $V_C$, in the absence of this novel compensation the output of the terminal 152 would be zero, and so the drive signals $V_{DRV}+$ and $V_{DRV}-$ would be zero, as well. It is generally desirable that the linear compensation factor $K_P$ be small, to provide a relatively broad dynamic range for the linear compensation. However, because of the small $K_P$, the integral compensation would end up generating the necessary signal to generate a drive signal to keep the actuator moving, were it not for the novel inverse proportional compensation. However, by providing the $1/K_{DRV}$ compensation to the command signal $V_C$ itself, in steady state, where the actuator is moving at a velocity substantially equal to that represented by the command signal $V_C$, the signal output by compensation unit 146 is $V_C/K_{DRV}$. After amplification by the amplifier 156, this is provided as a drive signal $V_{DRV}+$ at a voltage of $V_C$. In the absence of any substantial load this will be the correct voltage to hold the actuator in motion at the desired velocity. As a result, in such steady state no range need be used up by either the proportional compensation unit 148 or the integral compensation unit 150. These compensation units are, therefore, fully available to compensate for their intended function.

Figure 5:
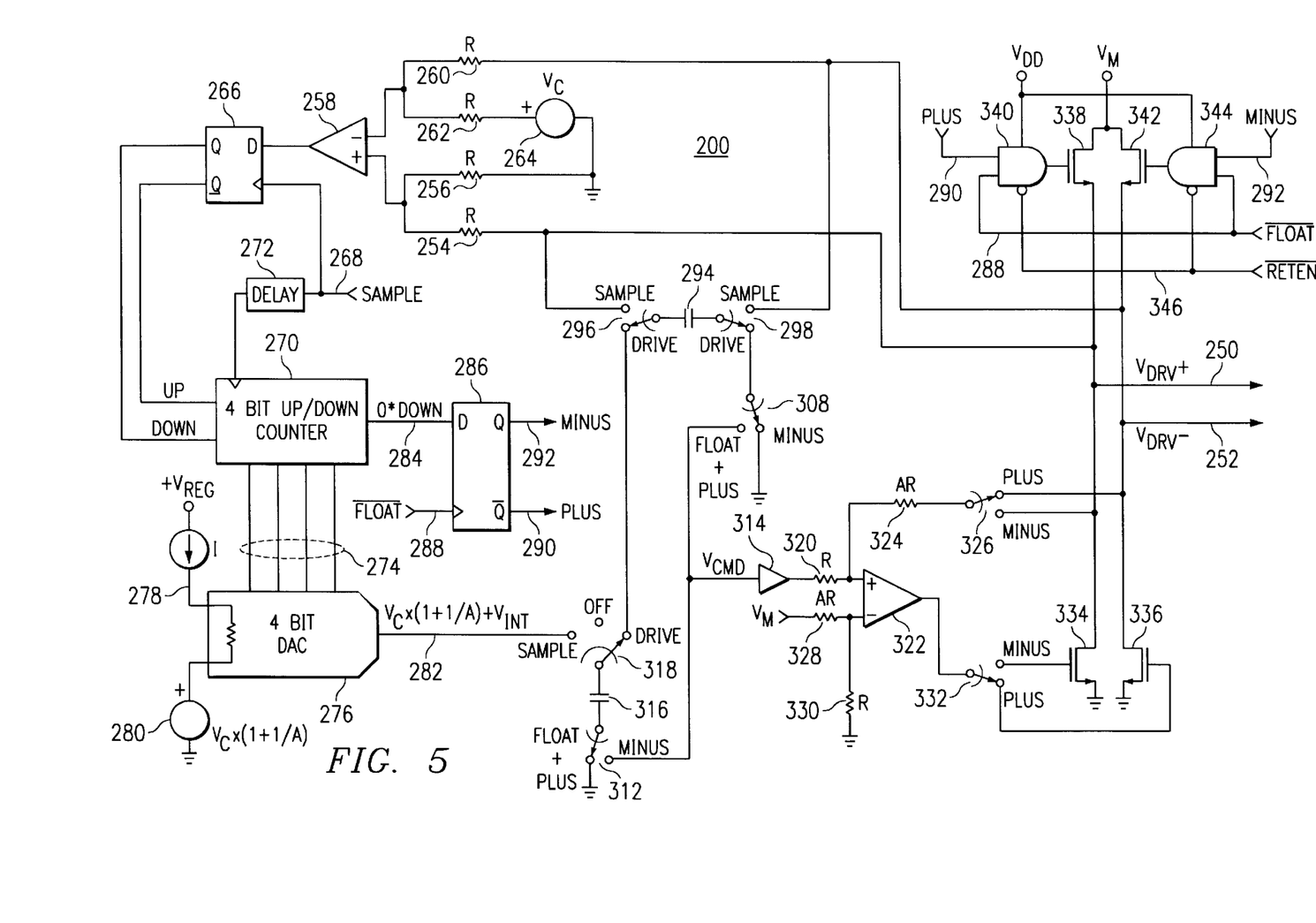
FIG. 5 is a circuit diagram of a preferred embodiment of the present invention.

The system shown in FIG. 4 may be implemented in circuitry or, alternatively in part or in whole in software. FIG. 5 is a circuit diagram of a preferred embodiment of the present invention. The control circuit 200 shown in FIG. 5 incorporates the features discussed above in conjunction with FIG. 4, and provides drive signals for an actuator (not shown in this figure). First, the components making up control circuit 200 will be described. Then, the principles of operation will be described.

Two output lines 250 and 252 provide drive voltages $V_{DRV}+$ and $V_{DRV}-$, respectively. Output line 250 is connected to one port of a resistor 254, having a value of R, where R is a resistance value of, for example, 1kΩ. Resistor 254 is connected in series with a resistor 256, having a value of R, to ground. The common connection node of resistor 254 and resistor 256 is connected to a plus input of a comparator 258.

Output line 252 is connected to one port of a resistor 260, having a value of R. Resistor 260 is connected to one port of a resistor 262, having a value of R, the other port of which is connected to a plus side of a voltage source 264 of a magnitude $V_C$, being the same $V_C$ as in FIG. 4. In hard disk drive actuator retract circuitry, the value of $V_C$ may be, e.g., 250 millivolts, which is small enough so that it may be maintained for the entire duration of a retract after a power failure, as the system voltage is decaying to zero. A conventional low voltage regulator circuit may be used to establish this, and other reference voltages described below.

The negative side of voltage source 264 is connected to ground. Thus, resistor 260, resistor 262 and voltage source 264 are connected in series between line 252 and ground. The common connection node of resistor 260 and resistor 262 is connected to a minus input of comparator 258. Resistors 260 and 262 form a 1:1 voltage "divider," as do resistors 254 and 256, and are provided as such because there is no attenuation of the feedback signal. The practitioner of ordinary skill in this art will understand that there may be instances in which it is desired to provide some attenuation in the feedback signal, in which case a correspondingly different ratio in the voltage divider will be appropriate. The voltage $V_C$ is, as mentioned above, the desired back-EMF voltage for the commanded retract speed. Thus, at the input of comparator 258 a comparison is performed to determine whether the voltage $V_{DRV}+$ at line 250, relative to the voltage $V_{DRV}-$ at line 252, is above, or below, the desired back-EMF voltage, that is, $V_C$. If it is above, then the output of comparator 258 will be driven high; if it is below, then the output of comparator 258 will be driven low.

The output of comparator 258 is connected to the D input of a latch 266. The output state of comparator 258 is captured periodically in latch 266, in response to a SAMPLE signal provided at input 268 to latch 266. The captured state is provided as Q and $\overline{Q}$ outputs of latch 266. These outputs are provided as inputs to a four bit up/down counter 270, with the Q output of latch 266 providing the DOWN input to counter 270, and the $\overline{Q}$ output of latch 266 providing the UP input to counter 270. Thus, counter 270 counts either up or down under control of the state captured in latch 266.

The SAMPLE signal on input 268 is delayed by the DELAY circuit 272, and the delayed SAMPLE signal is provided to the rising-edge-triggered count input of counter 270, thus causing counts of counter 270 at the delayed rising edges of the SAMPLE signal pulses.

The four bit output 274 of counter 270 is provided to the four bit input of a four bit digital-to-analog converter ("DAC") 276. The DAC 276 converts the digitized value at its four bit input to an analog voltage, in this case a voltage $V_{INT}$ representing a mathematical integral of the difference of the voltage on line 250, with respect to the voltage on line 252, as is described in more detail below. The DAC 276 receives a regulated voltage $V_{REG}$ and a reference current I on line 278. The output of the DAC 276, provided on line 282, is a voltage at $V_{INT}$, plus an offset of $V_C$, multiplied by the factor $$\left(1+\frac{1}{A}\right),$$

provided by voltage source 280. It will be noted that the factor 1/A effects the $1/K_{DRV}$ compensation provided by inverse proportional compensation unit 146 discussed above in connection with FIG. 4, the factor A being $K_{DRV}$. The factor A is selected to provide adequate responsiveness, while ensuring stability, according to conventional principles for selection of the gain factor for a drive amplifier for an actuator of the type being considered herein. An exemplary value is 6, but the particular value for the factor A is not limiting insofar as the scope of the instant invention is concerned.

The four bit up/down counter 270 has conventional logic circuitry included with it to permit it to detect when it has a count value of zero and it is in DOWN count mode. When such a condition occurs counter 270 provides an output signal on line 284, which is provided to the D input of latch 286. The value of the signal on line 284 is captured in latch 286 by the rising edge of the $\overline{\text{FLOAT}}$ signal (the falling edge of the FLOAT signal), provided on input line 288. The $\overline{Q}$ output of latch 286 is a PLUS signal, and is provided on line 290, while the Q output of latch 286 is a MINUS signal, and is provided on line 292. The PLUS and MINUS signals are used in a manner described below.

The value of the voltage difference between lines 250 and 252 is also sampled, by a capacitor 294. The capacitor 294 is connected at one port to the common port of a switch 296 and at the other port to the common port of a switch 298. Both switches 296, 298, are single-pole-double-throw, and switch in unison from a DRIVE position to a SAMPLE position, in response to the SAMPLE signal, and return to the DRIVE position when the SAMPLE signal is removed. Both switches 296, 298, are shown in the DRIVE position in the figure. All other switches in FIG. 5 are also single-pole-double-throw, except for switch 318, described below, which is a three-position-single-pole switch. All switches may be implemented as a pair of FETs, with the signal identifying the switch position in FIG. 5 being provided to the gate of the respective FET for enablement of that switch position. Note that switch 318 is also a pair of FETs, with the third, OFF "position" being the consequence of the fact that the SAMPLE and DRIVE signals do not completely overlap, as shown in FIG. 3.

The SAMPLE position port of switch 296 is connected to the $V_{DRV}+$ output line 250. The SAMPLE position port of switch 298 is connected to the $V_{DRV}-$ output line 252. Thus, the voltage difference between lines 250 and 252 is sampled at the same level as the voltage comparison is made at the input of comparator 258.

The DRIVE position port of switch 298 is connected to the common port of a switch 308. A MINUS position port of switch 308 is connected to ground, while a FLOAT OR PLUS position port is connected to a MINUS port of a switch 312 and to the input of a buffer amplifier (gain=1) 314. The other switch position port of switch 312, a FLOAT OR PLUS position port, is connected to ground. The common port of switch 312 is connected to one port of a capacitor 316. The other port of capacitor 316 is connected to the common port of a switch 318. A DRIVE port of switch 318 is connected to a DRIVE port of switch 296. A SAMPLE port of switch 318 is connected to the output of DAC 276, i.e., to line 282. An intermediate, OFF position of switch 318 floats.

Thus, when the switches are in the DRIVE and FLOAT OR PLUS positions, the compensated command voltage from DAC 276, $$V_C \times \left(1+\frac{1}{A}\right)+V_{INT},$$

stored on capacitor 316, minus the back-EMF voltage sampled and stored on capacitor 294, is provided as $V_{CMD}$ to the input of buffer amplifier 314. However, when the switches are in the DRIVE and MINUS positions, the inverse of that is provided as $V_{CMD}$ to the input of buffer amplifier 314, that is, the inverse of the compensated command voltage from DAC 276, $$V_C \times \left(1+\frac{1}{A}\right)+V_{INT},$$

stored on capacitor 316, minus the back-EMF voltage sampled and stored on capacitor 294, due to the reversal of switch positions.

The output of buffer amplifier 314 is connected to one port of a resistor 320 having a resistance of R. The other port of resistor 320 is connected to the non-inverting input of a differential amplifier 322 and to one port of a resistor 324 having a resistance of AR. The other port of resistor 324 is connected to the common port of a switch 326. A resistor 328 having a resistance of AR is connected between a voltage source $V_M$ and the inverting input of differential amplifier 322. The inverting input of differential amplifier 322 is also connected to one port of a resistor 330 having a resistance of R, the other port of which is connected to ground. The output of differential amplifier 322 is connected to the common port of a switch 332.

A MINUS port of switch 326 is connected to the drain of an NFET device 334, while a MINUS port of switch 332 is connected to the gate of NFET device 334. The source of NFET device 334 is connected to ground. A PLUS port of switch 326 is connected to the drain of an NFET device 336, while a PLUS port of switch 332 is connected to the gate of NFET device 336. The source of NFET device 336 is connected to ground.

The differential amplifier 322, in conjunction with resistors 320, 324, 328 and 330, performs an amplification of the compensated command signal $V_{CMD}$ by the factor A, again, being the factor $K_{DRV}$ described above in conjunction with FIG. 4.

The drain of NFET device 334 is also connected to the $V_{DRV}+$ output line 250, and to the source of a large current NFET 338, one of two "high side drivers." The drain of NFET device 338 is connected to the actuator voltage supply $V_M$. The gate of NFET device 338 is connected to the output of an AND gate 340. One input of AND gate 340 is connected to the PLUS signal line 290, while the other input of AND gate 340 is connected to the $\overline{\text{FLOAT}}$ signal line 288.

The drain of NFET device 336 is also connected to the $V_{DRV}-$ output line 252, and to the source of a high current NFET 342, the other of the two "high side drivers." The drain of NFET device 342 is connected to the actuator voltage supply $V_M$. The gate of NFET device 342 is connected to the output of an AND gate 344. One input of AND gate 344 is connected to the MINUS signal line 292, while the other input of AND gate 344 is connected to the $\overline{\text{FLOAT}}$ signal line 288. It will be appreciated that the NFET devices 338, 342, 334 and 336, may be either off chip or on chip.

The power supply for AND gate 340 and AND gate 344 is the power supply $V_{DD}$. The voltage level of this supply may be some voltage greater than $V_M$, for example $2 \times V_M$. This voltage may be stored on an external hold capacitor (not shown), if desired. This voltage ensures that the output signals of AND gate 340 and AND gate 344 are sufficiently high to drive their associated NFET devices 338 and 342, respectively, to a fully saturated ON state, even as the system supply voltage decays after a power failure.

A retract enable signal enables gates 340 and 344 through negative logic. Thus, $\overline{\text{RETEN}}$ is applied on line 346 to an inverting enable port of AND gate 340 and AND gate 344.

In operation, the control circuit 200 provides the active drive voltage through either line 250 or 252, as the case may be, as either device 338 is on and device 342 is off, or device 342 is on and device 338 is off. When device 338 is on, a closed path is formed from the actuator voltage supply $V_M$, through the actuator and device 336, to ground. When device 342 is on, a closed path is formed from the actuator voltage supply $V_M$, through the actuator and device 334, to ground. This provides two selectable drive directions to the actuator member.

Thus, this invention allows for voltage mode control of the velocity of an actuator. The approach described herein allows the use of either internal or external MOS transistors. In cases where external MOS transistors are required it eliminates the need for additional current sensing circuitry that would be required for current mode control. Therefore, in such instances where external MOS transistors are required, this approach is simpler and less expensive to implement.

Although the present invention and its advantages have been described in detail, it should be understood that various changes, substitutions and alterations can be made herein without departing from the spirit and scope of the invention as defined by the appended claims.

What is claimed is:

1. An apparatus for controlling an actuator, the apparatus comprising:

a first summing node, for summing or subtracting voltages applied thereto, as the case may be and receiving an input voltage signal at a first input, and having a control output voltage;

a proportional compensation unit receiving said control output voltage and providing as an output a proportionally compensated output signal;

an integral compensation unit receiving said control output voltage and providing as an output an integrally compensated output signal;

an inverse compensation unit receiving said input voltage signal as an input and providing an inversely compensated output signal;

a second summing node receiving said proportionally compensated output signal, said integrally compensated output signal and said inversely compensated output signal, and having a command voltage output signal corresponding to the sum of said input signals;

a voltage amplifier receiving said command voltage output signal and generating first and second control voltage signals; and a sense unit coupled to receive the control voltage signals and providing a voltage to a second, subtracting input of said first summing node.

2. An apparatus for controlling an actuator in response to a target speed voltage signal, said actuator having a moveable member and having a coil that influences movement of the member, comprising:

a sample pulse generator for generating regularly occurring sample pulses;

a voltage sense unit for sensing the voltage across said coil and providing a direction signal indicating whether said coil voltage is greater than, or less than, a reference voltage having a predetermined relationship to said target speed voltage;

an up/down counter responsive to said sample pulses, counting at the rate of said sample pulses, and counting either up or down under control of said direction signal;

a digital-to-analog converter responsive to the output of said up/down counter to provide a compensated voltage signal having a voltage corresponding to said up/down counter output, plus an incremental voltage;

a voltage sensing and holding unit that senses the voltage across and coil in response to said sampling signal and holds said sensed voltage;

a plus/minus indicator providing a plus/minus signal that switches between an indication of plus and minus in response to detecting that said up/down counter is counting down and that said up/down counter has reached a count of zero;

a first switch, responsive to said voltage sensing and holding unit and to said digital-to-analog converter for adding said sensed voltage signal to said compensated voltage signal to produce a command voltage signal, and providing said command voltage signal with a polarity controlled by said plus/minus signal;

a voltage amplifier, receiving said command voltage signal and providing a drive signal having a voltage magnitude that has a predetermined relationship to the voltage level of said voltage command signal; and a second switch, providing said drive signal to said coil in a direction determined by said plus/minus indicator output signal;

such that when a substantially zero load is presented to said actuator, the contribution to said drive signal from said incremental voltage corresponds to the voltage of said target speed voltage signal.

3. The apparatus of claim 1 wherein the first and second control voltage signals are coupled to drive said actuator.

4. The apparatus of claim 1 wherein the sense unit is operable to sense a back-EMF of said actuator.

5. The apparatus of claim 4 wherein said control output voltage corresponds to the difference between said target speed voltage and said sense back-EMF.

6. The apparatus of claim 1 and further comprising a sampling circuit coupled between the sense unit and the subtracting input of the first summing node.

7. The apparatus of claim 1 and further comprising a plurality of power transistors coupled to receive the control voltage signals, wherein the power transistors are external to an integrated circuit containing the amplifier.

8. The apparatus of claim 7 and further comprising an actuator, the actuator being driven by the power transistors.

9. The apparatus of claim 1 wherein the inversely compensated output signal has a voltage corresponding to the voltage of said input voltage signal multiplied by the inverse of a predetermined amplification factor.

10. An apparatus comprising:

a control circuit including a move command signal input node to receive a move command signal and first and second control voltage signal nodes, the control circuit generating first and second control voltage signals based upon proportionally compensated signal, an integrally compensated signal and an inversely compensated signal, the first and second control voltage signals being presented at the first and second control voltage signal nodes;

drive transistors coupled to receive the first and second control voltage signals; and an actuator driven by the drive transistors.

11. The apparatus of claim 10 wherein the actuator comprises a motor for operating a hard disk drive.

12. The apparatus of claim 10 wherein the actuator includes a read/write head for reading a magnetic disk.

13. The apparatus of claim 10 wherein said drive transistors comprise power transistor external to an integrated circuit containing the control circuit.

14. The apparatus of claim 13 wherein the drive transistors comprise power MOSFETs.

15. The apparatus of claim 10 wherein the move command signal comprises a target speed voltage signal.

16. The apparatus of claim 10 wherein the control circuit includes:

a first summing node with a summing input coupled to the move command signal input;

a proportional compensation unit with an input coupled to an output of the first summing node, the proportional compensation unit generating said proportionally compensated signal;

an integral compensation unit with an input coupled to said output of the first summing node, the integral compensation unit generating said integrally compensated signal; and an inverse compensation unit with an input coupled to the move command signal input, the inverse compensation unit generating said inversely compensated signal.

17. The apparatus of claim 10 wherein the control circuit comprises:

a first summing node, for summing or subtracting voltages applied thereto, as the case may be and receiving move command signal at a first input, and having a control output voltage;

a proportional compensation unit receiving said control output voltage and providing as an output said proportionally compensated output signal;

an integral compensation unit receiving said control output voltage and providing as an output said integrally compensated output signal;

an inverse compensation unit receiving said move command voltage signal as an input and providing an inversely compensated output signal;

a second summing node receiving said proportionally compensated output signal, said integrally compensated output signal and said inversely compensated output signal, and having a command voltage output signal corresponding to the sum of said input signals;

a voltage amplifier receiving said command voltage output signal and generating said first and second control voltage signals; and a sense unit coupled to receive the control voltage signals and providing a voltage to a second, subtracting input of said first summing node.

* * * * *